(12) United States Patent
Clemente et al.

(10) Patent No.: US 11,027,838 B2
(45) Date of Patent: Jun. 8, 2021

(54) IN FLIGHT CHARGING SYSTEM

(71) Applicant: Karman, Inc., Scotts Valley, CA (US)

(72) Inventors: Joshua Clemente, Culver City, CA (US); George O'Neal, Scotts Valley, CA (US); Chiranjeev Kalra, Pasadena, CA (US)

(73) Assignee: Karman, Inc., Scotts Valley, CA (US)

( * ) Notice: Subject to any disclaimer, the term of this patent is extended or adjusted under 35 U.S.C. 154(b) by 294 days.

(21) Appl. No.: 15/972,129

(22) Filed: May 5, 2018

(65) Prior Publication Data

US 2018/0346140 A1 Dec. 6, 2018

Related U.S. Application Data

(60) Provisional application No. 62/530,204, filed on Jul. 9, 2017, provisional application No. 62/502,633, filed on May 6, 2017.

(51) Int. Cl.
| | |
|---|---|
| *B64C 37/02* | (2006.01) |
| *B64D 39/02* | (2006.01) |
| *B64D 27/24* | (2006.01) |
| *B64C 39/02* | (2006.01) |

(52) U.S. Cl.
CPC .......... *B64C 37/02* (2013.01); *B64C 39/022* (2013.01); *B64C 39/024* (2013.01); *B64D 27/24* (2013.01); *B64D 39/02* (2013.01); *B64C 2201/066* (2013.01); *B64D 2221/00* (2013.01)

(58) Field of Classification Search
CPC . B64C 37/02; B64C 39/022; B64C 2201/066; B64D 39/00; B64D 39/02
See application file for complete search history.

(56) References Cited

U.S. PATENT DOCUMENTS

| | | | | |
|---|---|---|---|---|
| 5,074,489 | A * | 12/1991 | Gamzon | B64C 37/02 244/2 |
| 8,639,395 | B2 * | 1/2014 | Hudson | H04B 5/0012 701/3 |
| 8,820,681 | B2 * | 9/2014 | Brutoco | B64B 1/62 244/115 |
| 9,623,949 | B2 * | 4/2017 | Heppe | B64C 37/02 |
| 9,896,203 | B1 * | 2/2018 | Kim | B64D 27/24 |
| 10,418,853 | B2 * | 9/2019 | Yang | B64C 25/52 |
| 10,654,584 | B2 * | 5/2020 | Bosma | B64D 39/04 |
| 2009/0302149 | A1 * | 12/2009 | Fuchs | B64C 37/02 244/2 |
| 2012/0232721 | A1 * | 9/2012 | Engblom | G05D 1/105 701/3 |

(Continued)

FOREIGN PATENT DOCUMENTS

GB 2129382 A * 5/1984 ............ B64D 39/00

*Primary Examiner* — Joseph W Sanderson

(57) ABSTRACT

An in-flight charging system includes a first electric air vehicle, a second electric air vehicle, an elevated power supply system (EPSS) and a flexible tension member coupled to the first electric air vehicle and coupled to the second electric air vehicle. The flexible tension member provides power from the second electric vehicle to the first electric vehicle. The EPSS further includes one or more current carrying conductors, wherein the second electric air vehicle travels along the one or more current carrying conductors and receives power transferred from the one or more current carrying conductors.

12 Claims, 16 Drawing Sheets

(56) References Cited

U.S. PATENT DOCUMENTS

| | | | |
|---|---|---|---|
| 2012/0234964 A1* | 9/2012 | Heppe | B64C 37/02 |
| | | | 244/2 |
| 2013/0233964 A1* | 9/2013 | Woodworth | G05D 1/104 |
| | | | 244/2 |
| 2017/0015414 A1* | 1/2017 | Chan | H02G 1/02 |
| 2018/0095468 A1* | 4/2018 | Yang | B64C 25/52 |
| 2018/0257502 A1* | 9/2018 | Park | H02J 50/10 |
| 2019/0135113 A1* | 5/2019 | Koo | B60L 53/126 |
| 2019/0217952 A1* | 7/2019 | Zawadzki | G05D 1/0866 |
| 2019/0375296 A1* | 12/2019 | Syracuse | B60L 53/12 |
| 2020/0001993 A1* | 1/2020 | Kirkbride | B64C 39/022 |

* cited by examiner

Side View

Top View

IN FLIGHT CHARGING SYSTEM

RELATED APPLICATIONS

This application claims priority to U.S. provisional patent application Ser. No. 62/502,633, filed May 6, 2017, entitled "Transportation System," and U.S. provisional patent application Ser. No. 62/530,204, filed Jul. 9, 2017, and entitled "Transportation System," the disclosures of both of which are hereby incorporated by reference.

BACKGROUND

Various numbers and types of transportation systems allow for travel between origins and destinations via waterways, railroads, roads, or air; using various vehicles such as boats, ships, trains, cars, trucks, and/or aircrafts. To transport passenger and cargo within the vehicle, a transportation system achieves forward motion using a propulsion subsystem. A transportation system achieves trajectory following using a levitation and guidance sub-system with an associated control system.

Different types of propulsion and trajectory-following sub-systems are used in a given transportation system. A train uses traction motors driving steel wheels on steel rails as a propulsion sub-system, while a wheel-rail interface provides the function of levitation and guidance sub-system. An aircraft uses propellers or jet engines as thrust devices for propulsion sub-systems, while wings and aerodynamic control surfaces are used as levitation and guidance sub-systems in association with forward thrust or engine power.

The propulsion and trajectory following subsystems consume energy and need to have power on-board the vehicle for operation. The energy consumed by these sub-systems, in most practical transportation applications, increases in proportionality to velocity squared, as described by a von Kármán-Gabrielli diagram. Land-surface or track based systems, like railroads and automobiles, either carry an energy source on-board in the form of chemical energy of fuels or via electric energy storage in batteries or capacitors. Alternatively land-surface or track-based systems rely on wayside power supply for energy needs using a catenary or pantograph or other such electric supply system, or a combination of the two in dual power systems. Air and water based transportation systems exclusively carry energy or power on-bard the vehicle in the form chemical energy of fuels or via electric energy storage in batteries or capacitors to power these sub-systems.

Electric aircraft (e.g. referred to as flying car or drone) rely solely on stored energy or batteries for powering the aircraft from origin to destination. Such passenger aircraft can be designed using multiple propellers for lift during take-off and landing such that take-off and landing can be achieved vertically without the need for a runway. These vehicles are also referred to as electric Vertical Take-Off and Landing or "eVTOL" vehicles.

The current limitations in energy density of battery storage systems results in a limited range of eVTOL vehicles with small vehicle footprint. The range of such vehicles may be increased by using a larger battery pack or using a hybrid propulsion system, which increases a weight, size and footprint of the vehicle significantly.

DETAILED DESCRIPTION

Figure 1:
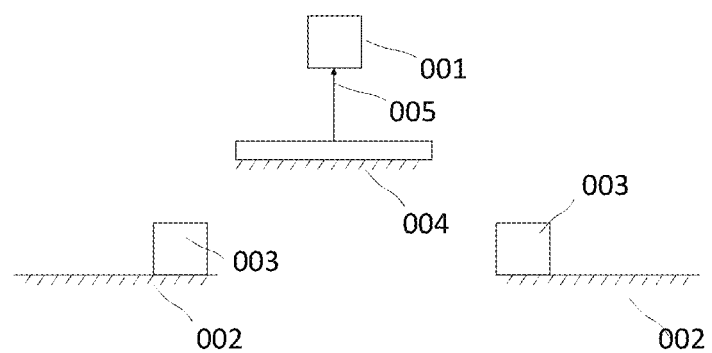
FIG. 1 illustrates a block diagram of a transportation system according to embodiments.

The following detailed description illustrates by way of example, not by way of limitation, the principles of the invention. This description will clearly enable one skilled in the art to make and use the invention, and describes several embodiments, adaptations, variations, alternatives and use of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

As used herein, the terms "about," "substantially," "significantly," or "approximately" for any numerical values, ranges, shapes, distances, relative relationships, etc. indicate a suitable dimensional tolerance that allows the part or collection of components to function for its intended purpose as described herein. The present invention relates to a transportation system. In embodiments, the transportation system vehicle described herein travels, during cruise, at a height above typical obstacles on ground like buildings and mountains and is located in air, elevated above an earth surface. In embodiments, the transportation system may be capable of moving people and cargo over a required distance between an origin and destination. In embodiments, the transportation includes an in-flight charging system. An in-flight charging system includes a first electric air vehicle, a second electric air vehicle, an elevated power supply system (EPSS) and a flexible tension member coupled to the first electric air vehicle and coupled to the second electric air vehicle. The flexible tension member provides power from the second electric vehicle to the first electric vehicle. The EPSS further includes one or more current carrying conductors, wherein the second electric air vehicle travels along the one or more current carrying conductors and receives power transferred from the one or more current carrying conductors.

In embodiments, an in-flight charging system includes a first electric air vehicle comprising a first spooling system, a second electric air vehicle comprising a second spooling system, an elevated power supply system (EPSS); and a tether coupled at a first end to the first spooling system in the first electric air vehicle and coupled at a second end to the second spooling system in the second electric air vehicle, the tether to provide power from the second electric vehicle to the first electric vehicle.

In embodiments, a system of in-flight charging and power supply to provide in-flight charging to electric air vehicles, includes a first electric air vehicle comprising a linking assembly, a probe and one or more elevated power supply systems (EPSS), the one or more EPSS positioned along travel route of the one or more electric aircraft. The EPSS engages with the robotic probe to transfer power from the EPSS to the first electric air vehicle. The EPSS operates at a specified voltage range and a specified current range. The EPSS includes one or more current carrying conductors to supply power to the probe via direct contact or inductive or capacitive coupling with the probe.

In embodiments, a transportation system may include 1) one or more vehicles; 2) one or more take-off and landing pads—designated or otherwise, one or more control systems, one or more communications systems and one or more elevated power supply systems (hereinafter referred to as "EPSS").

In embodiments, a method of operation includes powering of an air vehicle that is propelled using thrust devices (such as propellers or jets). In embodiments, the air vehicle may hover using thrust devices (such as propellers or jets), travel at low speeds, or may travel substantially in air at high cruise speeds of less than 100 kmph to greater than 1000 kmph. In embodiments, the air vehicle may travel and levitate at high speeds using a combination of thrust devices like propellers or jet engines, as well as aerodynamic features like airfoils and wings.

In embodiments, a method of operation of an air vehicle may be energized using a dual source of energy. In this method, the vehicle may be energized or powered using a wayside power supply system or the elevated power supply system (EPSS) for a substantial portion of a travelled distance. The vehicle, travelling in the proximity of the wayside power supply system or the elevated power supply system (EPSS), may receive electric energy in the form of alternating current (AC) or direct current (DC) through a direct sliding contact electrical connection.

In embodiments, an electric air vehicle may be energized using an inductive power transfer system. In embodiments, an inductive power transfer may be achieved via a resonant electro-magnetic coupling between a wayside elevated power supply system (EPSS) and an inductive probe on-board the vehicle at a design or specified frequency. In embodiments, the operating frequency may be 1 kHz to 3 kHz. In another embodiment, the inductive power transfer frequency resonant coupling frequency may be less than 1 kHz, and in an alternate embodiment greater than 3 kHz. In embodiments, the resonant electro-magnetic coupling at design frequency may maximize power transfer efficiency while reducing a size of a vehicle inductive probe in order to provide efficient power transfer.

In embodiments, a method of operation includes energizing a vehicle utilizing an on-board energy source (e.g., electric energy storage in batteries and/or capacitors) because during take-off, landing, and other substantial portions of distance travelled elevated power supply systems may not be available. In embodiments, an on-board energy storage system may be substantially recharged utilizing an elevated power supply system (EPSS) if an EPSS is available during flight of vehicle.

In embodiments, it is important for the transportation system to be operated in a safe manner because the air vehicles may be utilized for passenger transport. In embodiments, the in-flight power supply and/or in-flight charging should be operated in a safe manner.

In embodiments a passenger aircraft may be operated in proximity of a power line or elevated power supply system (EPSS). The elevated power supply system may be configured to supply direct current (DC) power at less than 1 kV, or alternatively at higher than 1 kV. In embodiments, the direct current (DC) power supply system may consist of a two wire system, one wire being utilized for ground and another wire being utilized for high voltage power supply. In embodiments, the elevated power supply system may be configured to supply alternating current (AC) power at less than 1 kV, or alternatively at higher than 1 kV. In embodiments, the alternating current (AC) power supply system may consist of a two wire system for a single phase supply, or more than 2 wire system for a multi-phase supply.

In embodiments, a passenger aircraft may be operated at a substantial distance from high voltage power lines or the elevated power supply system while transferring power from the high voltage power lines (or EPSS). In this illustrative embodiment, a passenger aircraft may maintain this established or predetermined distance from the power lines (or EPSS) such that in case of a potential or perceived fault or loss of control of the air vehicle, the air vehicle has enough time to respond and has the ability to move away from the power supply corridor or location while limiting the acceleration and jerk loads on the passengers.

Figure 11:
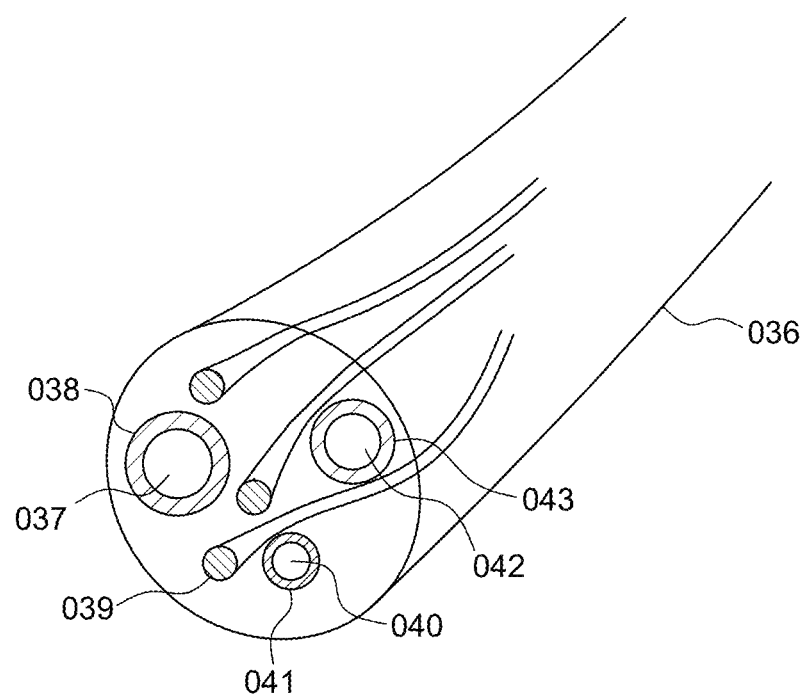
FIG. 11 illustrates a cross-section of a tether or flexible tension member according to embodiments.

In embodiments, a method of transferring power safely is described where a power source (e.g., power lines of an elevated power supply system) may be separated from an aircraft using a tether having a long length. In embodiments, a tether length may be determined by or based, at least in part on, an operating speed of a transportation system, passenger comfort, and/or ambient conditions (e.g., wind speed). In embodiments, a tether length may be less than 5 meters, or alternatively, may be more than 5 meters. In embodiments, the tether length may be variable as the air vehicle travels along the EPSS to overcome the gravity sag in the EPSS wires. In embodiments, a tether may consist of a single, or multiple, current carrying conductions, insulation around these conductors, and mechanical strength members or assemblies. FIG. 11 below illustrates a block diagram of a cross-section of a tether or flexible member.

Figure 8:
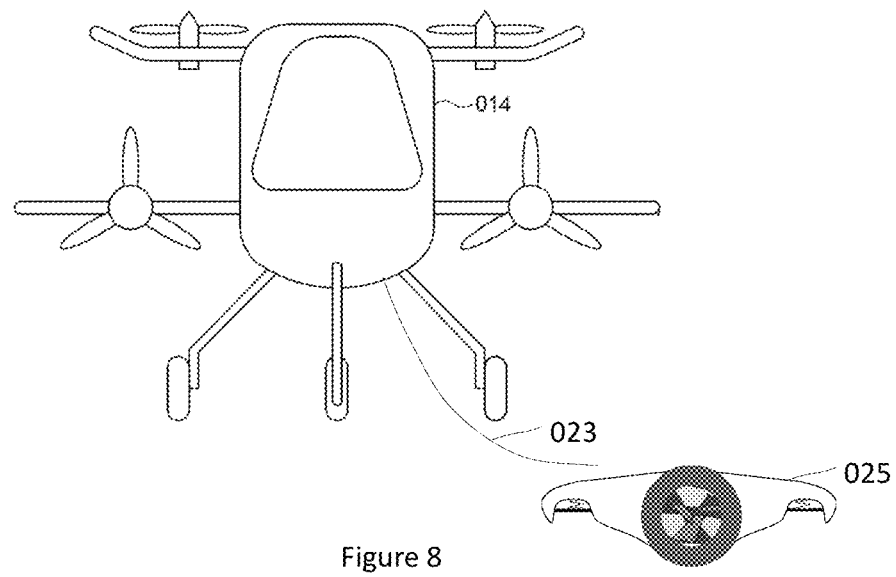
FIG. 8 illustrates a second vehicle connected to primary air vehicle via the tether according to embodiments.
Figure 12:
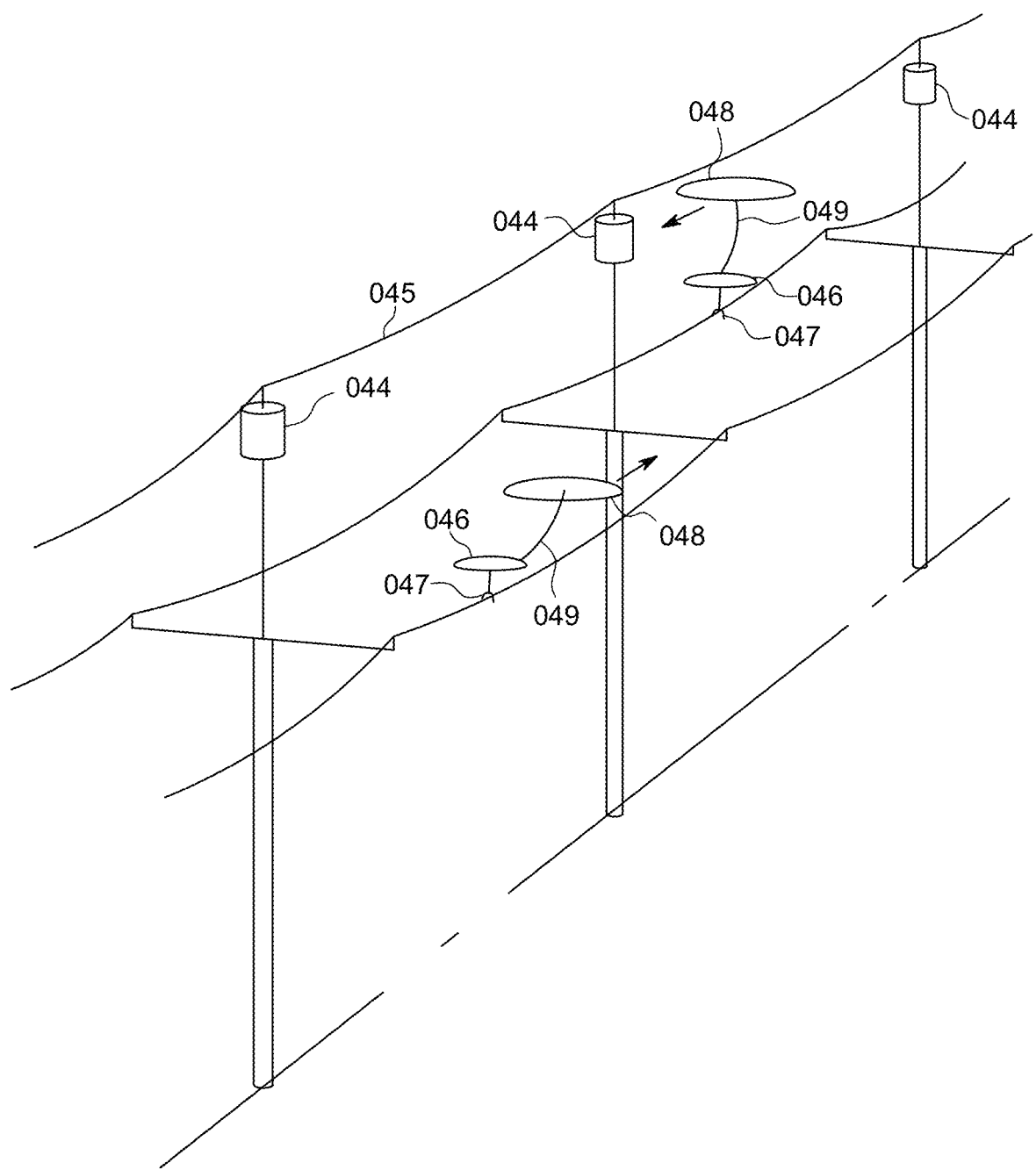
FIG. 12 illustrates an embodiment of a transportation system showing a location of wayside visual, LIDAR and IR sensor systems according to embodiments.

In embodiments, a method of transferring power is described where power is transferred from the power lines via the tether using a second vehicle. In embodiments, a second vehicle may be a small drone or an air vehicle. In embodiments, a second vehicle may travel along the power lines in close proximity to the power lines, which allows direct contact with the power lines and/or strong capacitive/inductive coupling of a probe on-board the second vehicle to the power lines, which results in high efficiency power transfer. FIG. 8 illustrates a second vehicle 025 being connected (via a tether 023) to a first air vehicle 014. FIG. 12 illustrates multiple first vehicles 048 being coupled or connected (via a tether 049) to a second air vehicle 046 which is connected or coupled to a current carrying conductor on a power line of an EPSS.

In embodiments, a method of operation is described where a second vehicle travels along the power lines such that the distance between the second vehicle and the power lines may be maintained within a tight gap. In embodiments, a tight gap may be maintained by using a combination of 1) thrust propellers; 2) aerodynamic surfaces like wings; 3) sensors to measure a distance from power lines; or 4) a control system, or 5) a combination thereof.

In embodiments, a method of engagement and disengagement of a second vehicle from the power lines and/or the primary vehicle is described. In this illustrative method, a second vehicle may be embedded inside a compartment in a primary vehicle. In this illustrative embodiment, once a primary vehicle is in the vicinity of the power lines, the second vehicle may physically exit or detach from the primary vehicle and may engage with the power lines for power transfer. In embodiments, for example, a second air vehicle may detach from a primary or first air vehicle. Following this, the second vehicle may partially land on power lines and/or may establish an electrical connection for charging. Partial landing of the second vehicle on the EPSS wires refers to partial loading of the wires with the weight of the second vehicle. In embodiments, the use of a second vehicle maintains a safe operating distance for the primary vehicle from the power lines. In embodiments, when required, the second air vehicle may have the ability to disengage from the power lines and may reattach to and/or reenter a compartment of the primary vehicle.

Figure 6:
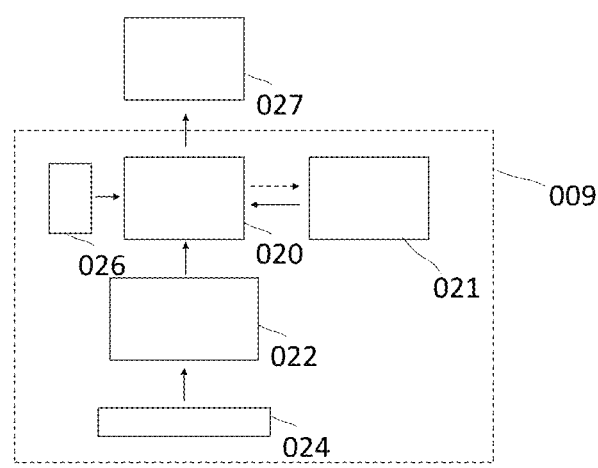
FIG. 6 illustrates a block diagram of on on-board power supply system in an air vehicle using a linking assembly according to embodiments.

In embodiments, a backup power system may be utilized to provide additional power in case there is a transient or momentary loss of power in the first air vehicle and/or the second air vehicle. The electrical connection between the second air vehicle and the wires may not be continuous (e.g., may be intermittent) due to momentary loss of contact and thus an additional power source may be utilized. In embodiments, the first air vehicle may include an additional battery uninterruptable power supply (UPS) to be utilized as a backup power supply to level load power supplied to the first air vehicle. In embodiments, a second air vehicle may include an additional battery or a UPS which may be utilized as a backup power supply in case there is transient loss of power transfer from the power lines to the air-vehicle due to the motion of the second vehicle relative to the power lines. In other words, as a second air vehicle electrical contact is touching the power lines it may lose contact as it travels along the wires (e.g., due to physical structures such as towers or environmental factors such as wind turbulence, rain, and/or temperature. In some cases, the interruption of power from the second air vehicle power supply may only be for a few milliseconds or seconds as the second air vehicle bumps along the wires. FIG. 6 illustrates a backup power supply.

In embodiments, a method of operation of a second vehicle, a primary transport vehicle and/or other such sets of transportation vehicles within the transportation system may be coordinated using a central command and control system. In embodiments, a central command and control system may determine an optimal operating speed, a trajectory and/or other attributes of travel within the transportation system by utilizing sensor input or measurements, a position of the vehicles, speed and acceleration of the vehicles or ambient conditions like wind speed or a combination thereof. In embodiments, a method of threat detection is described to detect potential safety threats to the air vehicles. In embodiments, a method may comprises ensuring a power supply to a primary transport vehicle, having the command and control system maintain continued operation and control of the various vehicles within the transportation system, and also utilizing autonomous systems to detect potential threats using visual, infra-red, and LIDAR images. In embodiments, these sensors may detect other vehicles and/or objects within an area or other potential dangerous environmental conditions that may be problematic to operation of an air vehicle.

In embodiments, autonomous systems may be visual, infra-red, LIDAR or other such sensors systems, or a combination thereof. In embodiments, these autonomous systems may be installed on the air vehicles and/or may be installed on the wayside towers of a transportation system. In this illustrative embodiment, when such sensors are installed on the wayside towers or other wayside structures, the sensor systems may be utilized to provide and/or evaluate safety conditions for multiple air vehicles within the range of such vehicles. In embodiments, the sensor system may include multiple cameras, infrared detectors or LIDAR systems or a combination thereof. In embodiments, one or more of the sensor systems may image or take measurements in areas surrounding one or more air vehicles. In embodiments, a control and/or command system or a control system (which may be located on ground, within one or more air vehicles, or a physical structure or at another geographical location), may communicate with one or more air vehicles to identify location of objects, other vehicles or dangerous conditions and provide instructions to guide one or more air vehicles to avoid the other vehicles or objects.

In embodiments, a method is described to move a primary vehicle outside of a trajectory or region where a perceived safety threat or detected safety threat has occurred. In this illustrative method, if a safety threat is perceived to a primary vehicle, the primary vehicle may mechanically detach from a tether and may move in a direction away from the safety threat or away from the elevated power supply system or the existing, power lines.

Figure 14:
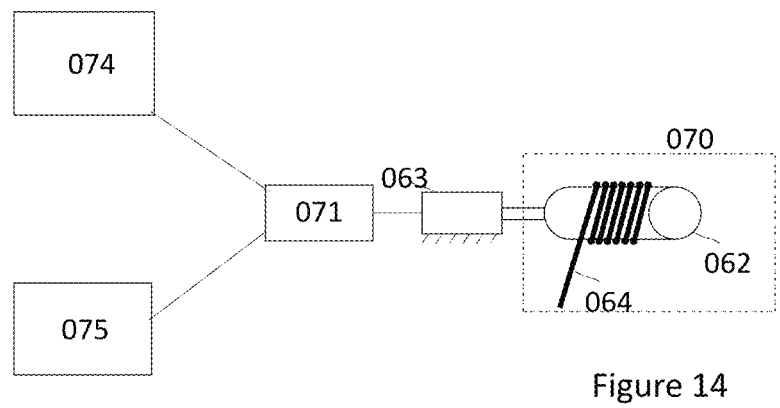
FIG. 14 illustrates an embodiment of the spool for a tether according to embodiments.

In embodiments, a method of fast retraction or safe spooling up of a tether onto a spool is described. In embodiments, a tether is connected to each of the air vehicles (e.g., a primary or passenger air vehicle at one end and a second or secondary vehicle at a second end. A broken tether may present problems because an end may move or flap around and potentially become engaged in a propeller and/or thrust device of either air vehicle. Thus, it is important to spool up or retract the tether to prevent engagement with the propeller and/or thrust device. In embodiments, the spool may be positioned or located on a primary vehicle and/or a second vehicle. In embodiments, the spool may be passive, (e.g., may be operated utilizing stored energy in a mechanical spring) or may be active (e.g., may be operated using an electric motor to allow for faster spooling of the tether. In embodiments, a spooling system (e.g., a winch) may operate at a spool-up speed such that the tether, if broken, spools up before any possibility of interaction with the propellers of a primary air vehicle and/or a second air vehicle. In embodiments, a computing device may control operation of a spooling system. In embodiments, a spool-up speed of a spooling system may be determined by one or more of the following factors: a length of a broken or disengaged tether, a distance from the propellers of the primary or secondary air vehicle, and/or ambient conditions like wind speed. In embodiments, the spooling system including the spools may be installed and/or positioned on both or either of the primary vehicle as well as a second vehicle. FIG. 14 illustrates a spooling assembly and a control system.

In embodiments, a method is described of utilizing a long robotic arm or linking assembly to transfer power safely from a power source comprising of power lines of elevated power supply system. In embodiments, a linking assembly length may be determined by an operating speed of the transportation system or ambient conditions like wind speed, or a combination thereof. In embodiments, a tether length may be less than 5 meters, or alternatively more than 5 meters.

Embodiments described herein may include components for a transportation system, which may be an air transportation system. In embodiments, a transportation system may be capable of moving people and cargo over a given distance between an origin and a destination. In embodiments, a transportation system may include a vehicle to provide safe containment for people or cargo being transported, which may be referred to as a containment vessel. In addition to the containment vessel, the vehicle (e.g., air vehicle) may comprise a propulsion system and a trajectory following subsystems, and/or also an associated control and communication system.

In embodiments, a containment vessel may include comfortable seating for one or more passengers, an environmental control system (e.g., heating and/or air conditioning system), and other associated sub-systems for safe containment of passengers including passenger airbags, seatbelts, windows, an entertainment console, one or more computing devices, and/or emergency vehicle controllers (steering) or systems, etc. In embodiments, a control system may communicate with an environmental control system and other associated subsystems.

In embodiments, the containment vessel may also include a modular cargo compartment or a container that may be utilized with different transportation vehicle (e.g., an air vehicle, a car chassis and/or a train compartment. In other words, the modular cargo compartment or container may be detachable from one transportation vehicle and move (or be moved) to another transportation vehicle without passengers and/or cargo needing to exit the modular cargo compartment.

In embodiments, a propulsion sub-system of the air vehicle is a thrust device including an electric motor driven propeller or jet. In embodiments, a propeller may have a shrouded design for noise reduction.

In embodiments, a trajectory following sub-system of a vehicle may be a combination of multiple thrust devices including an array of electric motor driven propellers working in tandem. In embodiments, a control system of an air vehicle may be able to control and/or modulate thrust force, down force, lateral force, pitch moment, roll moment, and yaw moment for the combination of multiple thrust devices. In embodiments, a control system may actively control not only multiple thrust devices, but also may control specially designed aerodynamic surfaces, airfoils, or wings oriented vertically or horizontally, or a combination thereof, at various angles of attack and may use these systems or surfaces to provide such above-mentioned forces and moments.

In embodiments, a containment vessel, a controls subsystem, a propulsion sub-system and a trajectory following sub-systems of an air vehicle may be powered using a power electronics package on board an air vehicle. In embodiments, a power electronics package may comprise one or more variable frequency drives, one or more transformers, and/or one or more rectifiers to provide required power supply needs of the air vehicle subsystems. In embodiments, a variable frequency drive may be an adjustable-speed drive system used in electro-mechanical drive systems to control motor speed and torque by varying motor input duty cycle or frequency and voltage. A control system may communicate with a power electronics package.

In embodiments, a power electronics package may receive power (e.g., current and/or voltage) from a combination of on-board power sources (e.g., electric energy storage systems such as one or more batteries and/or capacitors, as well as a wayside power source. In embodiments, a wayside power source may provide electric energy (e.g., current and/or voltage) to the power electronics package in an air vehicle using a non-contact inductive catenary system, a contacting catenary, a pantograph or other such systems, or a combination thereof. In embodiments, in addition to providing electric energy to the vehicle sub-systems, the power generated by the wayside power source may be used to charge the on-board electric energy storage batteries or capacitors. In embodiments, a wayside power system may refer to one or more towers and/or one or more power lines which have been installed to provide power to air vehicles. In embodiments, this may be a separate power network from existing power lines. In embodiments, the wayside power system may utilize existing towers but may utilize new or different power lines to provide power to the one or more air vehicles.

Figure 3:
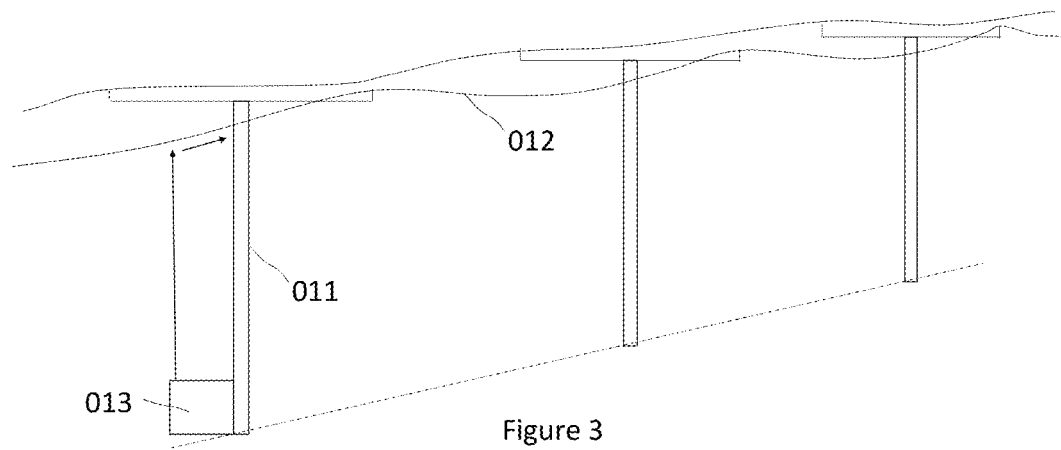
FIG. 3 illustrates an elevated power supply system (EPSS) according to embodiments.

In embodiments, the air vehicle may travel in proximity of an elevated power supply system and/or power lines. When referring to an elevated power supply system or EPSS, this may refer to a newly established power supply system for air vehicles. FIG. 3 illustrates an EPSS. In an embodiment, an elevated power supply system (EPSS) may comprise one or more exposed wires 012 carrying electric current or voltage. In this embodiment, the one or more exposed wires may transfer energy to an adjacent probe, a linking assembly or tether via an inductive coupling, a capacitive coupling or a direct contact, or a combination thereof. In this embodiment, the one or more elevated cables of the EPSS may be held in place on a monolithic tower similar to a telephone pole, or similar to a wind turbine tower or a truss type structure, or a combination thereof, the towers 011 being similar to a high voltage transmission cable tower. In this embodiment, an elevated power supply system (EPSS) may derive power from a land based electric substation 013 or a local power grid, or a combination thereof. In this embodiment, one or more exposed wires may be one or more current carrying conductors. In an embodiment, cables may carry one or more exposed wires or one or more current carrying conductors.

In embodiments, an elevated power supply system may be powered using intermediate wayside substations. In embodiments, the intermediate wayside substations may ensure the required voltage and current is available for the operation of the primary vehicles within the transportation system. In embodiments, a transmission power may be at high voltage 25 kV or 50 kV, or in an alternative embodiment, higher than 100 kV. In embodiments, a transmission power may be greater than 175 kV. In embodiments, an air vehicle may utilized of 1 kV or 3 kV of power, either AC or DC.

In embodiments, the elevated power supply system (e.g., the elevated power cables) may comprise 1) one exposed current carrying conductor at high voltage that is AC or DC, 2) one or more additional exposed current carrying conductors with high voltage at different phase angles from the one exposed current carrying conductor at the high voltage in case of an AC system, and/or 3) an additional current carrying conductor at a ground potential.

In embodiments, the elevated power supply system cables (elevated cables) may be held in place or supported in air, (at a significant distance away from a ground surface and/or other potential obstacles), by using or utilizing one or more drones or unmanned air vehicles (UAV). In embodiments, the one or more drones or UAVs may be powered by the elevated power supply system using direct contact or inductive coupling. In embodiments, the one or more drones or UAVs may be replaced by another drone or UAV in flight for scheduled maintenance, malfunctions, power replenishment, and/or end of life replacement. In embodiments, the one or more drones or UAVs may have power supplies that provide to the elevated power system supply cables. In embodiments, the one or more drones or UAVs may be tethered to a wayside power system or an existing power line to provide power to EPSS cables. In embodiments, there may be two sets of cables connecting one or more towers. In embodiments, one set of wires may carry high voltage that is transformed to a lower voltage on board a unmanned aerial vehicle (UAV) for consumption by the one or more air vehicles that is attached to the second set of cables.

In embodiments, a linking assembly and a mechanical probe may extend from the air vehicle to establish electric energy transfer with the elevated power supply system (EPSS). In embodiments, a linking assembly may be a robotic arm. In embodiments, a linking assembly may be comprised of at least one rigid link. In embodiments, a linking assembly may further include a telescopic system, a rotational system, a suspension and damper system or assembly, and/or other such systems to enable travel in an independent trajectory from the air vehicle. In embodiments, a control system may control deployment and/or activation of the linking assembly (and/or the suspension and damper system, the telescopic system and/or the rotational system). In embodiments, a control system may be a computing device. In embodiments, a control system may be located in an air vehicle. In embodiments, providing an independent trajectory for the air vehicle relative to the probe may provide for safe and comfortable travel for passengers of the transportation system, because the independent trajectory allows the air vehicle to maintain a safe distance from high voltage power supply wires while still allowing efficient power transfer.

In embodiments, the linking assembly may contain at least one contact surface that may engage with or make contact with sufficient surface pressure with the exposed wires or conductors of the elevated power cables in the EPSS. In embodiments, the at least one contact surface may be made of carbon, graphite, metal, metal alloy or other electrically conductive materials, or a combination thereof. In embodiments, the contact surface material may be chosen such that it results in low wear of the exposed electric wires of the elevated power cables in the EPSS. In embodiments, a probe may comprise one or more metal contacting strips or one or more graphic bushings. In embodiments, the probe may be comprised of one or more coils or inductive loops. In embodiments, a second air vehicle may comprise a linking assembly, a probe, one or more sensor devices and/or a control system. In embodiments, one or more sensor devices may comprise one or more optical sensors, one or more cameras, a GPS receiver, a LIDAR sensor, or a probe sensor. In embodiments, a control system may adjust operational parameters of a flight of a second air vehicle. In embodiments, the operational parameters may comprise propeller power, vehicle orientation, a wing angle of attack or an aerodynamic flap angle. In embodiments, the control system adjusts operational parameters of the second air vehicle to cause a trajectory of a second air vehicle to remain close to the one or more current carrying conductors of the EPSS to transfer power from the EPSS to the second electric air vehicle.

In embodiments, a probe is provided at the end of the linking assembly positioned to be in close proximity of the power cables, and the probe may contain a coil including one or multiple turns of an electric conductor, where the coil is positioned or physically arranged to travel or be located in close proximity of the elevated power cables of the EPSS to allow inductive power transfer from the elevated power supply system to the air vehicle. In embodiments, the inductive coil may be designed or configured to allow resonant coupling with a wayside power system to provide for high efficiency power transfer.

In embodiments, a sensor of the one or more sensor devices may be a probe sensor. In embodiments, the probe sensor may comprise a load cell or a spring to detect the contact pressure between the one or more contacting strips or the one or more graphite bushings and the one or more current carrying conductors. In embodiments, a sensor of the one or more sensor devices is a probe sensor, the probe sensor may be a proximity sensor to detect a distance between the one or more coils or inductive loops of the second air vehicle and the one or more current carrying conductors of the EPSS.

In embodiments, a transportation power system may include a first or primary air vehicle, a second or secondary air vehicle, and/or one or more power cables of EPSS. In embodiments, a transportation system may comprise a tether connecting or coupling the primary air vehicle with the secondary air vehicle. In embodiments, a linking assembly and a probe may connect or couple a secondary air vehicle to EPSS power cables. In embodiments, a second air vehicle may detach mechanically from a primary air vehicle (or may exit from a storage or holding area of a first or primary air vehicle) while still remaining in physical contact with the first air vehicle via a flexible tension member or tether. In embodiments, the flexible tension member or tether may utilize solid conductors or conductor lines to provide multiple electrical current pathways. In embodiments, the flexible tension member may also contain electrically insulating members to isolate the electric current pathways of the solid conductors or conductor lines. In embodiments, the flexible tension member may also contain other members, assemblies or structures to provide mechanical strength and support. In embodiments, the flexible tension member may remain attached to the primary vehicle at one end and the second vehicle at the other end. In embodiments, a second vehicle may have propulsion sub-system and a trajectory following sub-system made up of a single thrust device or a combination of multiple thrust devices like an electric motor driven propeller working in coordination with aerodynamic surfaces, airfoils, or wings at various orientations. In embodiments, the propulsion subsystem and trajectory following subsystem may allow the second vehicle to travel along a path in proximity to the elevated power supply system. Optimal electric power transfer between the EPSS and the second air vehicle may occur due to this close proximity without having to worry as much about safety because there are not passengers in the second air vehicle. In embodiments, a flexible tension member and the separation of the primary air vehicle from the secondary air vehicle and the power lines) provides an advantage over prior system because the flexible tension member provides for a safe isolation of the first air vehicle, including the people or cargo in the first air vehicle, from the high voltage power supply wires while enabling high efficiency power transfer from the elevated power supply system to the second air vehicle and then to the first air vehicle.

In embodiments, the second air vehicle may travel along the elevated power wires or cables of the elevated power supply system at a speed comparable to the primary or first air vehicle. As the primary or first air vehicle approaches the EPSS to derive power, the second air vehicle may maintain speed comparable to the primary or first air vehicle. In embodiments, the second air vehicle may be in close proximity of the primary air vehicle, as may be handled via by a central control and command system. In embodiments, the two air vehicles may establish power transfer and communication channels by using a flexible tension member or tether. In embodiments, the flexible tension member or tether may extend from the primary air vehicle to the secondary air vehicle and establish an electrical connection. In embodiments, the flexible tension member may provide one or more electrical current pathways via one or more solid conductors or one or more conductor lines. In embodiments, a flexible tension member may also include one or more electrically insulating members or lines to isolate the electric current pathways in the one or more solid conductors or conductor lines or cables. In embodiments, the flexible tension member may also contain other linear members (support structures, housings, walls, etc.) to provide mechanical strength and support, while the flexible tension member or assembly is in operation. In embodiments, the flexible tension member may remain attached to the primary air vehicle at one end and may establish connection or coupling with the second air vehicle in flight. Alternatively, the opposite may occur with the tension member remaining attached with the second air vehicle and connecting or coupling with the first air vehicle in flight. In embodiments, the central control and command system may be a computing device. In embodiments, the central control and command system may monitor and adjust speed of the air vehicles (e.g., the primary air vehicle and the secondary air vehicle), the distance between the air vehicles and/or a length of a tether between the air vehicles. In embodiments, a second air vehicle may maintain continuous contact with the elevated power cables (or close to continuous contact). In embodiments, the flexible tension member may attach/detach to the secondary air vehicle.

In embodiments, the second air vehicle may contain at least two contact surfaces that may engage or be in contact with sufficient surface pressure when connecting or coupling to the one or more exposed wires of the elevated power cables of the elevated power supply system. In embodiments, the contact surfaces may be made of carbon, graphite, metal, metal alloy or other electrically conducting materials, or a combination thereof. In embodiments, the contact surface material may be chosen to result in low wear of the exposed electric wires of the elevated power cables of the power supply system.

In embodiments, the second air vehicle may include one or more coils made up of one or more turns of an electric conductor. In embodiments, the one or more coils may be positioned and/or arranged to travel or be in close proximity of the elevated power cables of the elevated power supply system to enable inductive power transfer from the elevated power supply system to the second air vehicle. In embodiments, the inductive coil design may allow for resonant coupling with the wayside power system or EPSS to provide for high efficiency power transfer.

In embodiments, the primary or first vehicle, the secondary or second vehicle, and/or the probe (or linking assembly) may have sensors, global positioning system (GPS) receivers, infra-red sensors, optical cameras, LIDAR systems, electro-magnetic wave receivers or radio-frequency transmitters, or a combination thereof that may determine, calculate and/or transmit a location and/or status of the primary vehicle, secondary vehicle, and/or the probe (or linking assembly) to a control system and/or a safety system utilized or positioned on ground. In embodiments, the control system may be resident or installed on ground.

In embodiments, the EPSS system, the linking assembly, the probe, or the tether, or either of the air vehicles may include sensors for a detection of potential safety threats to the air vehicles. In embodiments, such detection and sensor systems may include detectors to measure a quality of continued power transfer through a tether. In embodiments, detectors may also measure continued operation and control of the various vehicles within the system from a command and control system. In embodiments, autonomous systems may also detect potential threats using visual, infra-red, and LIDAR images. In embodiments, visual, infra-red, LIDAR, or other such sensors may be installed on the first air vehicle, the second air vehicle, the EPSS or on the wayside power system. In embodiments, wherein such sensors are installed on the wayside power system, the safety or multiple vehicles may be evaluated because the sensors may be utilized by any air vehicles that are in the range or vicinity of the sensor on the wayside power system.

In embodiments, the wayside control system and safety system may disconnect power transfer to an elevated power supply system for routing, system safety and security or any other related reasons like a potential collision between vehicles if they continue on the planned course or trajectory. For example, the wayside control system may disconnect power supply to the EPSS if the wayside control system determines, based on sensor data, that a malfunction with the operation of the second vehicle, a malfunction of the tether, and/or a malfunction of any other vehicle in the system has occurred and that malfunction may pose a risk to the safety and security of the passenger on board the air vehicles within the system.

In embodiments, a spool retracting system or assembly may be capable of fast retraction or safe spooling up of the tether onto a spool either on the primary air vehicle or the second air vehicle. In embodiments, a spool retracing system will have to have a controller, a spring or motor, a physical spool and a tether. In embodiments, the spool retracting assembly may be passive, operating on the stored energy in a mechanical spring. In embodiments, the spool retracting assembly may be active and utilize an electric motor to enable faster spooling of the tether as compared to the passive spool retracting assembly. In embodiments, the spool retracting assembly may operate at spool-up speeds to prevent the possibility of a broken tether interacting with and/or touching the propellers of a primary air vehicle. In embodiments, a computing device or control system may control a spool retracting system. In embodiments, a spool retracting system may determine how fast a spool-up speed may need to be to address safety concerns by evaluating 1) the length of actual or potential broken or disengaged tethers; 2) a distance the tether is from the propellers of the primary air vehicle; and/or 3) ambient conditions like wind speed. In embodiments, the spool retracting systems or assemblies and/or spools may be provided on both a primary or first air vehicle as well as a second air vehicle. FIG. 14 illustrates the spool assembly or spool retracting assembly In embodiment, an on-board air vehicle control system may communicate with and work in coordination with a wayside control system. In embodiments, an air vehicle control system may be a computing device. In embodiments, the control systems (e.g., wayside control system and/or on-board air vehicle control system) may utilize user and operator or predetermined preferences to determine an optimal trajectory, speed, altitude, and/or other such travel attributes like time dependent speed, orientation, and/or accelerations, of a primary air vehicle, a secondary air vehicle and/or or a probe (or a linking assembly).

In embodiments, a primary air vehicle may travel in a vertical plane that is a substantial distance away from a vertical plane containing the one or more wires of the one or more elevated cables of elevated power supply system. In other words, in embodiments, the primary air vehicle may not be positioned directly above the one or more elevated cables of the EPSS (and may be off to the side). In embodiments, this separation allows a primary air vehicle to travel in air or space corridor that is not directly above the exposed wires elevated power supply system wires. In embodiments this positioning is critical for safety of the primary air vehicle and passengers within the vehicle and provides an advantage over existing power distribution systems. In embodiments, a horizontal separation between a vertical plane of the primary air vehicle and a vertical plane of the one or more wires of the elevated power cables of the elevated power supply system may be less than 1 meter, or less than 10 meters, in another embodiment, or greater than 10 meters in an additional embodiment. In embodiments, the horizontal separation may be primarily determined to provide safe operation of the primary air vehicle pas well as provide passenger comfort. In embodiments, the horizontal separation between the primary air vehicle and the one or more wires in the one or more elevated power cables may be larger in situations where dynamic loading and external environmental forces on the primary air vehicle may be expected to be higher (due to wind gust, turbulence, change in gust strength frequency, etc.). In embodiments, the separation distance may also be larger when available lateral guidance force from the aerodynamic thrust devices and other aero guidance surfaces like wings is limited so that higher separation is required for highly reliable operation in order to meet passenger safety requirements. In embodiments, a vertical separation and/or a horizontal separation between a primary air vehicle and the one or more wires of the power cables of the elevated power supply system may also be varied during travel to ensure passenger comfort in addition to meeting safety requirements. For example, in embodiments, in case of separation between the towers of the elevated power supply system the gravity sag of the wires of the elevated power cables of the EPSS may be several meters in the vertical direction. In embodiments, the towers of the EPSS may be less than 100 meters in height, or in alternative embodiments, the towers of the EPSS may be greater than 100 meters in height. In embodiments, if the gravity sag of the wires of the elevated power cables is several meters, and the primary vehicle must move or adjust to accommodate this sagging, such variation and/or movement in the trajectory of the primary vehicle may be uncomfortable for the passengers due to high and variable vertical acceleration loads or movements.

In embodiments, the guidance, levitation, and propulsion capabilities on one or both the primary air vehicle and the secondary air vehicle may monitor and control the distance between the primary air vehicle and the elevated power supply system when both air vehicles are attached using a flexible tension member. In embodiment, the primary air vehicle propulsion may be aerodynamic propellers, while guidance and levitation systems and assemblies are a combination of thrust devices and aerodynamic surfaces like wings. In embodiments, a secondary air vehicle may have thrust devices like aerodynamic propellers, aerodynamic surfaces like wings to provide independent propulsion, guidance and levitation from the primary air vehicle. In embodiments, the secondary air vehicle may utilize 1) normal force on wheels; 2) a sliding contact on elements of an elevated power supply system; or 3) traction force from electric motor driven wheels or some combination of these to provide independent propulsion, guidance and levitation from the primary air vehicle.

In embodiments, a control system may determine a length of the flexible tension member or tether. In embodiments, a length of a flexible tension member may be variable during a flight of the primary air vehicle and a secondary air vehicle. In embodiments, the length of the flexible tension member may be adjustable or variable as determined and/controlled by a control system in order to provide safe, reliable, and/or efficient operation of the transportation system. In embodiments, a control system may be a computing device. In embodiments, a control system may determine and/or calculate a length of the flexible tension member based at least in part on a speed of the primary vehicle, the trajectory of the primary air vehicle, instantaneous wind loading in an environment around the primary air vehicle, the secondary air vehicle and the EPSS, as well as other factors. In embodiments, a length of a flexible tension member may be varied by using a spool retracting system or assembly that winds or rolls the flexible tension member on a spool at the primary vehicle end, the secondary vehicle end, or both or other such means of changing the length of the flexible tension member during flight.

In embodiments, the flexible tension member or tether may be disconnected from the primary vehicle in case of an emergency or otherwise for the safety of the passengers. The flexible tension member may be disconnected automatically or passively if the tension load within the flexible tension member exceeds a pre-set value or predetermined threshold tension load. In yet another configuration or embodiment, a control system of the primary air vehicle may generate and communicate a signal to the spool retracting assembly to disconnect the flexible tension member. Similarly, a wayside control system may generate such a control signal or command and may communicate this signal or command to a spool retracting system on either of the air vehicles. In embodiments, an operator of either of the air vehicles may also generate a disconnection signal or command and communicate such disconnection signal or command to the spool retracting system or assembly. Once disconnected, the primary air vehicle may land at its original destination, or may land at an emergency landing site along a travel route. In embodiments, emergency landing sites may be custom built for this EPSS transportation system. Alternatively, the emergency landing site may be a dual-use site where a primary use may be a roadway for vehicular traffic. In embodiments, an emergency landing site may be a section of a roadway or a highway where traffic lights and/or automated physical barriers may be utilized to stop or divert traffic during an emergency landing. In embodiments, a traffic management system for handing such emergencies with primary air vehicles may be integrated into an existing transportation system control system to ensure reliable and safe landing of the primary air vehicle during an emergency.

In embodiments, one EPSS may have multiple air vehicles traveling in the same direction along the one or more wires of the one or elevated power cables. In embodiments, these air vehicles may be spaced apart from one another along the length of the EPSS. In embodiments, an orientation around the power lines of the elevated power supply system and a distance of the air vehicles from and/or with respect to each other may be varied for the various air vehicles for safety considerations. For example, in embodiments, a primary air vehicle 1 may be traveling along the elevated power supply system cables with the tether oriented at an angle of 10 degrees above a horizontal plane and the following primary air vehicle 2 (which may be following at a distance of 500 meters, for example, and with its tether oriented at an angle of 20 degrees above the horizontal axis. In embodiments, the horizontal distances and vertical distances of different primary air vehicles may be varied such that the EPSS transportation system has a highest probable safety rating possible. In embodiments, a control system may determine and/or calculate the clocking angles of the tethers with a horizontal plane, i.e. the horizontal distances, and the vertical distances between air vehicle and the power cables EPSS-based power system. In embodiments, a control system may calculate the clocking angles, the horizontal distances, and/or the vertical distances between different air vehicles based at least in part on 1) various loads on the one or more air vehicles and loads on air vehicles including vehicle masses, aerodynamics and wind loads; 2) lift, guidance and propulsion capabilities of the air vehicles; 3) availability of the emergency landing sites; 4) air vehicle speeds; 5) numbers of vehicles in the system, or 6) how far the vehicles are spaced apart; or 7) a combination thereof.

In embodiments, the second air vehicle may disengage from the one or more wires of the elevated cables of the elevated power supply system and fly away from the one or more wires of the elevated power supply system. In embodiments, a second air vehicle may disengage due to emergency conditions or because of safety concerns (e.g., lightning, bad weather, debris in air, etc.). In embodiments, the second air vehicle may also disengage when the elevated power supply system cannot be available for a suitable trajectory of the primary air vehicle or other reasons (e.g., such as malfunctioning equipment).

In embodiments, the air vehicle control system may modulate the speed of an air vehicle to limit the number of air vehicles in any given section of the elevated power supply system. In embodiments, the vehicle control system may take input from the wayside control system and the various sensors on the air vehicle to make the determination of an optimal air vehicle speed. In embodiments, a vehicle control system may take input from the operator of the air vehicle to make a speed determination.

In embodiments, the air vehicle may be operated autonomously for transportation from an origin to destination. The transportation system may have a command and control center in a given geographic area to control all the air vehicles in that geographic area. In embodiments, a command center may have a group of operators with the capability to take over all or some aspects of control of any air vehicle remotely, (e.g., such as in an emergency situation), from the command center. In embodiments, the operators may determine themselves if there is an emergency situation. Alternatively, an automated algorithm or by an artificial intelligence/machine learning system (e.g., computer-readable instructions stored in one or more memory devices and executable by one or more processors) may determine if an emergency situation may be present by evaluating and/or considering collected flight sensor measurements, passenger input, weather data or measurements, or system operating parameters, or any combination thereof.

In embodiments, an air vehicle may have an operator onboard the air vehicle. In embodiments, the driver provide input to the on-board control system in order to assist the on-board control system to determine and implement the optimal trajectory, speed, altitude, and other such travel attributes of the primary air vehicle, secondary air vehicle, the flexible tension member, and/or a linking assembly and/or probe.

FIG. 1 illustrates a block diagram of a transportation system according to embodiments. In embodiments, the transportation system may include one or more air vehicles 001 and one or more ground based stations 002 for take-off and landing. In embodiments, the transportation system may include one or more ground based power supply stations 003, which provide electric power for operation of the transportation system. In embodiments, an elevated power supply system 004, may generate and transfer electric power to one or more air vehicles 001 through one or more contacting or inductive (non-contacting) catenary-type systems 005.

Figure 2:
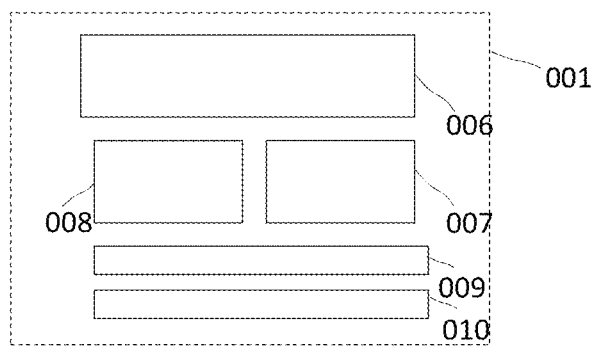
FIG. 2 illustrates a block diagram of the transportation system vehicle according to embodiments.

FIG. 2 illustrates a block diagram of a transportation system air vehicle according to embodiments. In embodiments, one or more air vehicles 001, may include a transport vessel 006 to provide containment or space for people or cargo being transported on the one or more air vehicles 001. In embodiments, the one or more air vehicles 001 may comprise one or more propulsion sub-systems 007 and one or more trajectory following sub-systems 008. In embodiments, the one or more propulsion sub-systems 007 and trajectory following subsystems 008, propel, levitate, and guide the one or more air vehicles from an origin point to a destination point. In embodiments, one or more air vehicles 001 may comprise one or more power supply systems 009 and/or one or control systems 010. In embodiments, the power supply system 009 may provide electric energy for on-board power needs of the air vehicle and components and assemblies (e.g., propulsion sub-systems 007, trajectory following sub-systems 008, control system 010). In embodiments, the control system 010 may control, analyze and/or monitor the various sub-systems and other attributes of an air vehicle 001 such as speed, altitude, location, yaw and/or pitch.

FIG. 3 illustrates an elevated power supply system according to embodiments. In embodiments, an elevated power supply system may include one or more columns 011 to hold one or more catenary wires 012 at an elevated plane (e.g., an elevated horizontal plane) above a ground level or surface. In embodiments, the columns 011 may support multiple catenary wires or current carrying conductors 012. In embodiments, the one or more catenary wires or current carrying conductors or flexible tension members 012 have the capability to carry electric current as supplied from a ground based power station 013. In embodiments, the one or more or multiple catenary wires or current carrying conductors may transfer electric energy to a probe travelling in close proximity to the one or more catenary wires or current carrying conductors via a contacting or inductive (non-contacting) probe or a capacitive (non-contact) probe.

Figure 4:
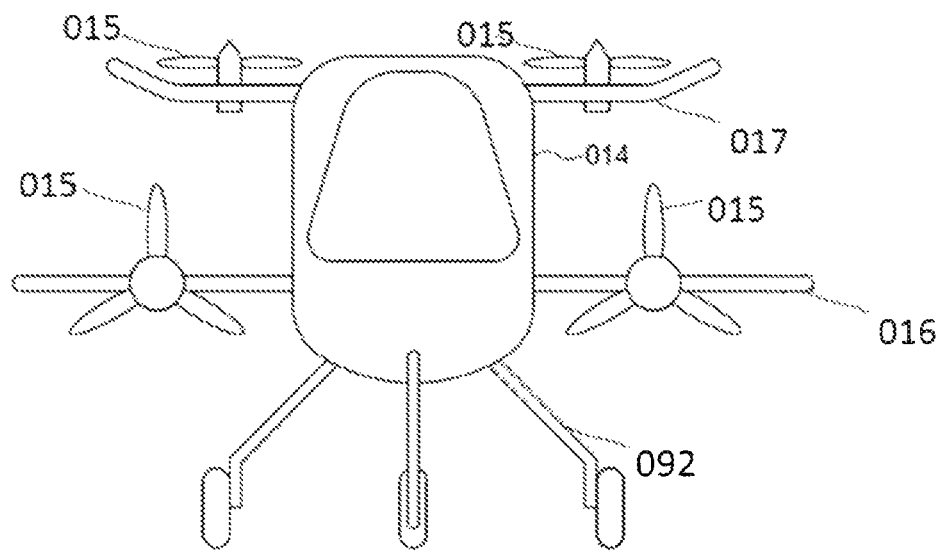
FIG. 4 illustrates an exemplary air vehicle according to embodiments.

FIG. 4 illustrates an air vehicle 001 according to embodiments. In embodiments, the air vehicle 001 may comprise a fuselage 014, one or more rotor assemblies 015 with fixed or variable orientations, aerodynamic features like one or more wings 016, one or more winglets 017, and a landing system 092. In embodiments, a fuselage 014 may also include a cabin for safety occupation by passenger or crew. In embodiments, a fuselage 014 may also include a flight computer, a control system, and/or a power supply system (not shown). In another embodiment, fuselage 014 may include cargo bays (not shown).

Figure 5:
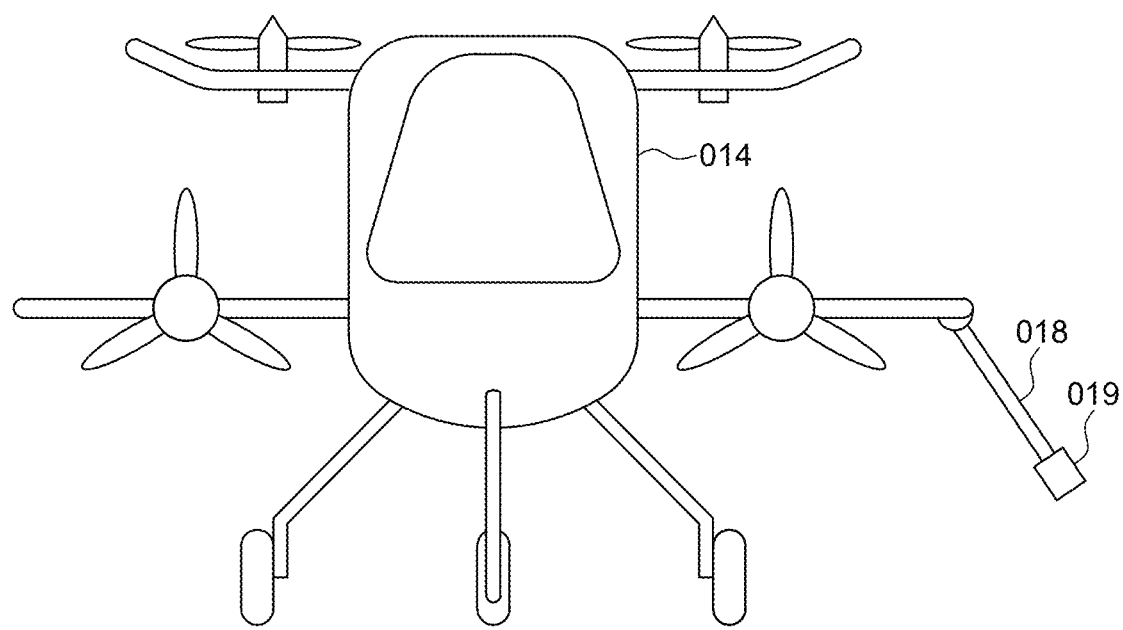
FIG. 5 illustrates an air vehicle with an extended linking assembly according to embodiments.

FIG. 5 illustrates an air vehicle 001 with an extended linking assembly 018 according to embodiments. In embodiments, a linking assembly 018 may comprise a probe 019, which may be connected at an end of a linking assembly 018 opposite from the fuselage 014. In embodiments, a linking assembly 018 may be connected or coupled to a fuselage 014, one or more wings 016 or one or more winglets 017 via a mechanism or assembly to allow for independent horizontal and/or vertical trajectory of the probe 019 within a vicinity of air vehicle 001. In embodiments, a probe 019 may include contacting strips or non-contacting inductive coils to enable power transfer from a wayside catenary power system to a power supply system within fuselage 014 (not shown).

FIG. 6 illustrates a block diagram of a power supply system 009 on-board an air vehicle 001 in according to embodiments. In embodiments, a power supply system or power electronics package 009 may comprise a power electronics package 020, an energy storage system 021, a linking assembly 022, a probe 024, and a ground based plug-in system 026. In embodiments, a power electronics package 020 may supply or provide electric power to run various sub-systems, or components or assemblies 027 on board the vehicle. In embodiments, a backup power supply system 090 may provide power to run the various sub-systems or components or assemblies on board the air vehicle in case of power interruption (either due to energy storage system 021 issues and/or intermittent providing of power from an EPSS and/or air vehicle.

Figure 7A:
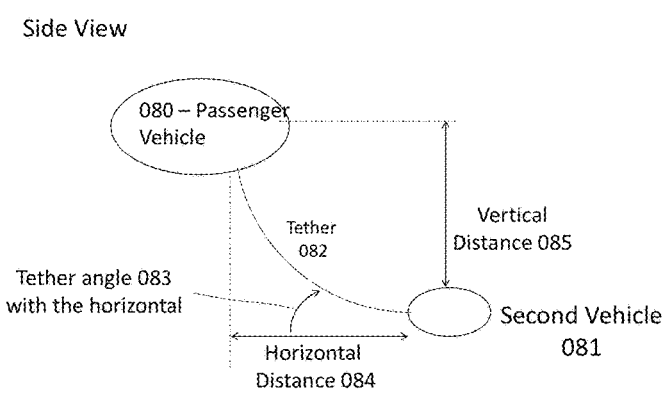
FIG. 7A illustrates a side view and clocking angles between a first air vehicle, a tether and a second air vehicle.
Figure 7B:
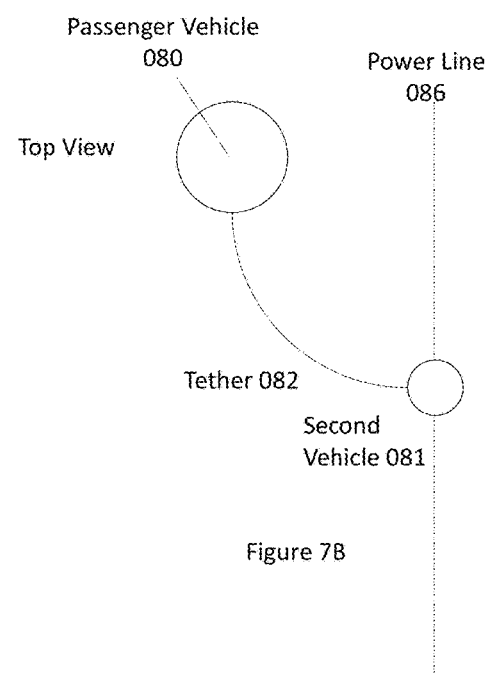
FIG. 7B illustrates a top view and an orientation of a first air vehicle, a tether and a second air vehicle

FIG. 7A illustrates a side view and clocking angles between a first air vehicle, a tether and a second air vehicle. FIG. 7B illustrates a top view and an orientation of a first air vehicle, a tether and a second air vehicle. In embodiments, an orientation around the power lines of the elevated power supply system and a distance of the air vehicles from and/or with respect to each other may be varied for the various air vehicles for safety considerations. For example, in embodiments, a primary air vehicle 080 may be traveling along the elevated power supply system cables 086 with the tether 082 oriented at an angle of 10 degrees above a horizontal plane and the following primary air vehicle 081 (which may be following at a distance of 500 meters, for example, and with its tether oriented at an angle of 20 degrees above the horizontal axis (the 20 degrees above horizontal being the clocking angle 083). In embodiments, the horizontal distances 084 and/or vertical distances 085 of different primary air vehicles 080 may be varied such that the EPSS transportation system has a highest probable safety rating possible. In embodiments, a control system or a central control and command system may determine and/or calculate the clocking angles of the tethers 083 with a horizontal plane, i.e. the horizontal distances 084, and the vertical distances 085 between air vehicles 080 and 081 and the power cables 086 of the EPSS-based power system. In embodiments, a control system or a central command and control system may calculate the clocking angles, the horizontal distances, and/or the vertical distances between different air vehicles based at least in part on 1) various loads on the one or more air vehicles and loads on air vehicles including vehicle masses, aerodynamics and wind loads; 2) lift, guidance and propulsion capabilities of the air vehicles; 3) availability of the emergency landing sites; 4) air vehicle speeds; 5) numbers of vehicles in the transportation system; 6) how far the vehicles are spaced apart, or 7) a combination thereof.

FIG. 8 illustrates a connection or coupling of a second air vehicle and a first air vehicle according to embodiments. In an embodiment, a second air vehicle 025 may mechanically separate from a primary vehicle 001 and may follow an independent horizontal and/or vertical trajectory, but remain in physical proximity of a primary vehicle 001. In this embodiment, the two air vehicles 001 and 025 may be connected via the ends of a flexible tension member 023 (or one or more flexible tension members) or one or more tethers 023.

Figure 9:
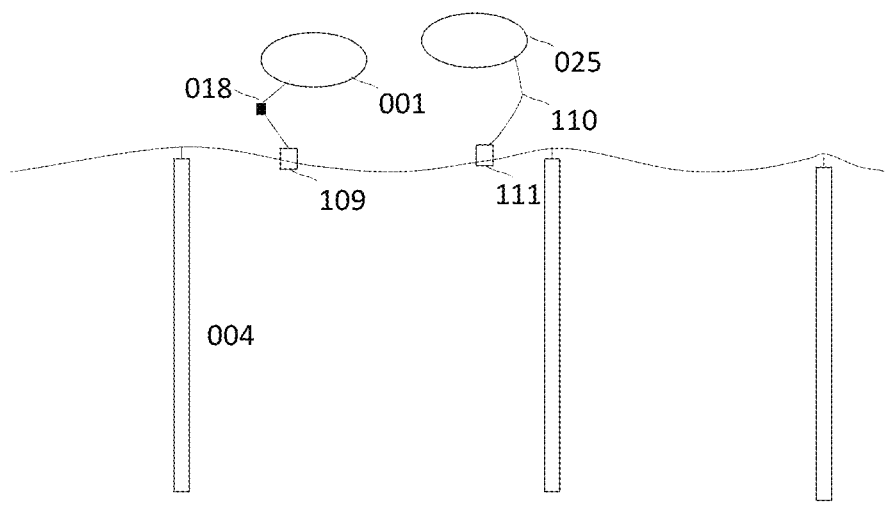
FIG. 9 illustrates multiple air Vehicles traveling along the Elevated Power Supply System.

FIG. 9 illustrates multiple air vehicles traveling along an Elevated Power Supply System (EPSS) according to embodiments. In an embodiment, an air vehicle 001 may couple to an EPSS 004 via a linking assembly 018 with a probe 109 to transfer power to the air vehicle 001. In an embodiment, a primary air vehicle 025 coupled to a second air vehicle 111 may be coupled to the EPSS 004 via a flexible tension member 110. The second vehicle 111 travels along the current carrying conductors of the EPSS 004 and transfers power via the flexible tension member 110 to the primary air vehicle 025

Figure 10:
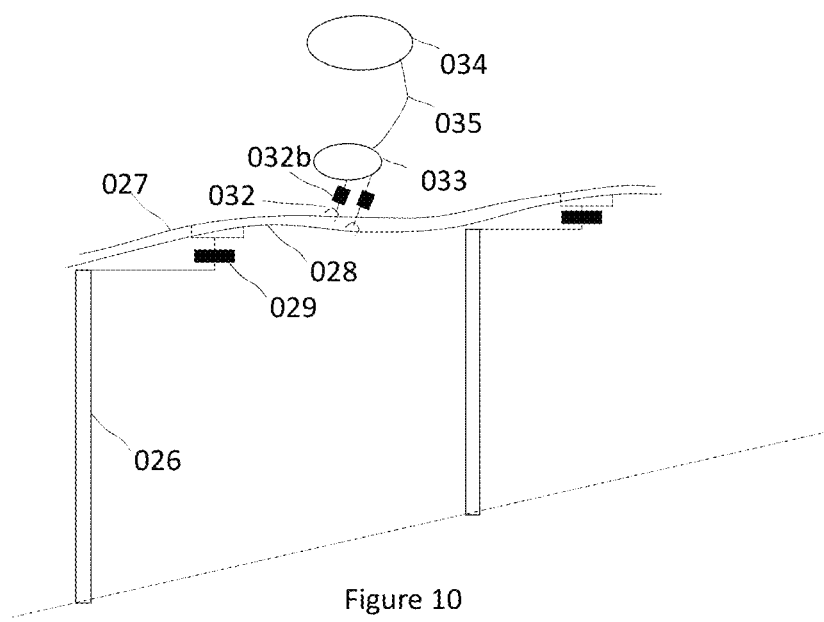
FIG. 10 illustrates a two wire elevated power supply system to supply high voltage DC power to the eVTOL vehicle, via tether or a flexible tension member or assembly according to embodiments.

FIG. 10 illustrates a two-wire elevated power supply system to supply high voltage DC power to the eVTOL air vehicle 034, via the tether or flexible tension member 035. In an embodiment, a tether 035 may be engaged to one or more catenary wires 027 and 028 (or current carrying conductors) via one or more graphite bushings 031 and 032 that are part of or connected to a second air vehicle 033. In this embodiment, one or more graphite bushings 031 and 032 may be installed on a second air vehicle 033 using a suspension damper assembly 032b. In this embodiment, one or more catenary wires (or current carrying conductors) 027 and 028 may be held at a required elevation using one or more connections 030 with one or more towers 026 through an assembly including one or more insulators 029. In this embodiment, one or more catenary wires 027 and 028 may be also referred to as current carrying conductors.

FIG. 11 illustrates the cross-section of an embodiment of the tether or flexible tension member according to embodiments. In an embodiment, a flexible tension member 035 may comprise one or more current carry conductors 037 and 042 embedded inside insulating members 038 and 043. In an embodiments, the tether may also carry multiple mechanical strengthening members, assemblies, cables or wire 039 that may be arranged in a braided configuration for additional strength and/or rigidity. In this embodiment, a mechanical strength and rigidity of these members, assemblies, cables or wires may be location dependent along a length of a tether (e.g., a metallic chain assembly). In an embodiments, a tether or flexible tension member 025 may also consist of one or more communication channels 040 (or wires or fiber carrying data or information) with associated insulation in order to communicate control signals and/or data signals bi-directionally from the first air vehicle to the second air vehicle.

FIG. 12 illustrates a transportation system showing the location of the wayside visual, LIDAR and IR sensor systems 044 according to embodiments. In an embodiment, a sensor suite, housing or grouping 044 may be located along each of the towers and may provide visual, IR, or LIDAR data or a combination thereof that is communicated back to the central control command system or a control system located within the one or more air vehicles. In this embodiment, based at least in part on this data, a central control and command center may, based at least in part, on 1) received data from the sensor suite, housing or group 044; 2) ambient conditions in an environment around the one or more air vehicles and/or 3) GPS location data from various air vehicles in the transportation system, may determine a next set of operating parameters for the one or more air vehicles in the transportation system. In an embodiment, the central control and command center or the air vehicle control systems may communicate and may then provide and/or communicate commands including the determined next set of operating parameters to the one or more air vehicles. In an embodiment, an elevated power supply system may be accompanied with a safety ground wire 045 to protect the system from lightning strikes. FIG. 12 also illustrates a first air vehicle 048 connected via a tether or flexible tension member 046 to a second air vehicle 046, which is connected to the current carrying conductors of the EPSS via graphite bushings 047.

Figure 13:
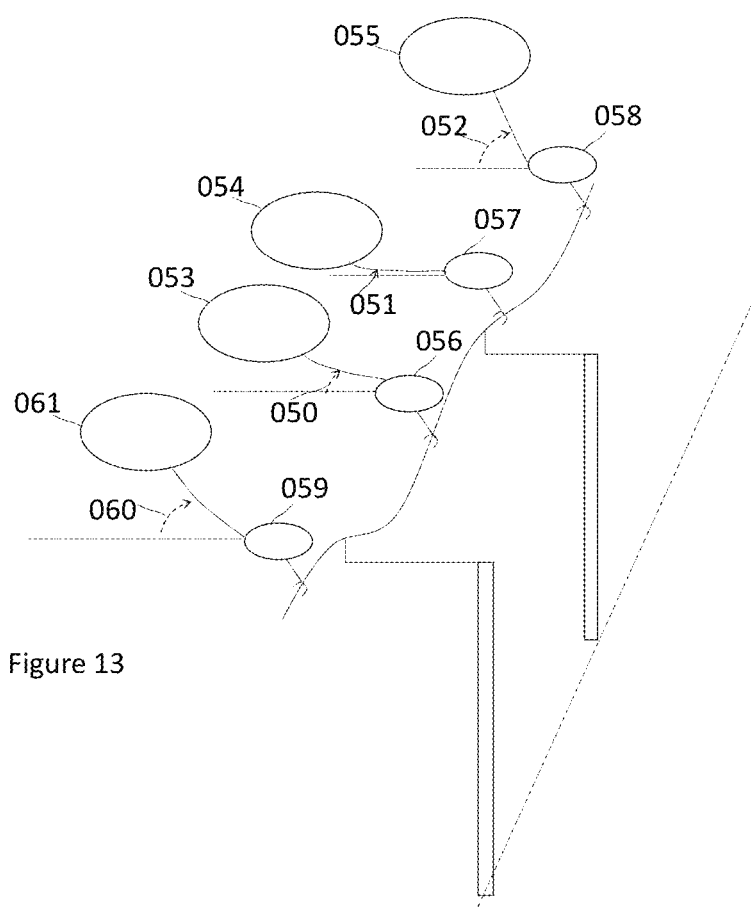
FIG. 13 illustrates clocking on eVTOL vehicles in a system at different angles according to embodiments.

FIG. 13 illustrates clocking angle or orientation angles on eVTOL vehicles in the transportation system at different angles—060, 050, 051, 052 according to embodiments. In embodiments, placing air vehicles at a different angles with respect to power towers and/or each other may be done to increase an apparent distance between two adjacent air vehicles in the transportation system, to reduce the negative impacts of traveling in the trailing vortex or wake of the leading air vehicle and to optimize energy consumption. For example, first air vehicle 055 is connected or coupled to second air vehicle 058 using a tether or flexible tension member at a clocking angle illustrated by reference number 052. In embodiments, first air vehicle 054 is connected or coupled to second air vehicle 057 using a tether or flexible tension member at a clocking angle illustrated by reference number 051, which is a smaller angle than the clocking angle 051. This allows there to be greater distance separation between first air vehicles 054 and 055. In embodiments, first air vehicle 053 is connected or coupled to second air vehicle 056 using a tether or flexible tension member at a clocking angle illustrated by reference number 050. Clocking angle 050 is greater than clocking angle 051 but less than clocking angle 052. In embodiments, first air vehicle 061 is connected or coupled to second air vehicle 059 using a tether or flexible tension member at a clocking angle illustrated by reference number 060. In embodiments, one of the negative impacts of traveling in a trailing vortex may include increase energy consumption as well as dangers to passenger safety. In embodiments, placing air vehicles at different angles with respect to power towers also increases safety because the air vehicles don't have to deal with trailing vortexes or wakes of leading air vehicle.

FIG. 14 illustrates an embodiment of the spool 062 for a tether 064 according to embodiments. In embodiments, a spool retracting assembly 070 (or a spooling assembly) may be powered by a motor 063 for fast retraction of the tether 065 in case of an emergency to avoid entanglement with the propellers of the primary eVTOL air vehicle. In embodiments, a controller 071 may communicate to a motor to control a speed of a motor. In embodiments, a spooling assembly 070 or a controller 071 may receive commands from a control system 074 in an air vehicle or a central control and command system 075 which may determine when to retract the tether 065. In embodiments, the control system 074 or the central control and command system 075 may determine when and how fast to retract the tether based at least in part on 1) a length of actual or potential broken or disengaged tethers; 2) a distance the tether is from the propellers of the primary air vehicle; or 3) ambient conditions like wind speed, temperature, humidity or other weather conditions, or 4) a combination thereof. In embodiments, the spool retracting systems or assemblies and/or spools may be provided on both a primary or first air vehicle as well as a second air vehicle.

Figure 15:
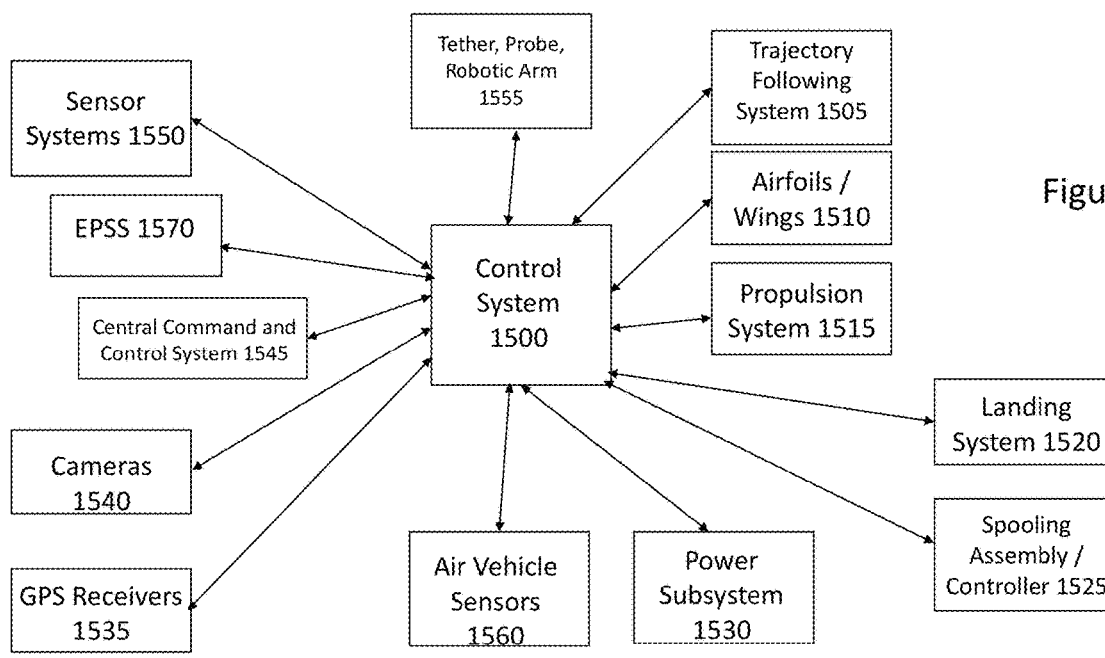
FIG. 15 illustrates a block diagram of communications between a control system and various other systems and components according to embodiments.

FIG. 15 illustrates a block diagram of communications between a control system and various other systems and components according to embodiments. In embodiments, a control system 1500 in an air vehicle may communicate with a number of subsystems in an air vehicle as well as other assemblies, components and/or systems (e.g., computing devices) external to an air vehicle. In embodiments, a control system 1500 may communicate with one or more trajectory following systems 1505, airfoils and/or wins 1510, one or more propulsion systems 1515, one or more landing systems 1520 and/or one or more spooling assemblies and/or controllers 1525. In embodiments, an air vehicle may also comprise sensor assemblies and a control system 1500 may communicate with these internal or aircraft-mounted sensor assemblies. In embodiments, a control system 1500 may comprise with external systems or assemblies. In embodiments, for example, a control system may communicate with a sensor suite (or one or more sensors) 1550, one or more cameras and/or imaging assemblies 1540, and/or one or more GPS receivers 1535. In embodiments, a central command and control system 1545 may be a computing device. In embodiments, a central command and control system 1545 may comprise one or more processors, one or more memory devices and/or computer-readable instructions executable by one or more processors to perform functions described above and below. In embodiments, a central command and control system 1545 may communicate commands, instructions, signals or messages to a control system 1500 as well as communicate other information to the control system 1500. In embodiments, a control system 1500 may also communicate instructions, commands, signals and instructions as well as other measurements or data to a central command and control system 1545. In embodiments, a central command and control system 1545 may determine an optimal operating speed, a trajectory and/or other attributes of travel within the transportation system by utilizing sensor input or measurements from one or more sensor systems 1550, a position of the vehicles, speed and acceleration of the vehicles or ambient conditions like wind speed or a combination thereof. In embodiments, a method of threat detection is described to detect potential safety threats to the air vehicles. In embodiments, a method may comprise ensuring a power supply to a primary transport vehicle, having the command and control system maintain continued operation and control of the various vehicles within the transportation system, and also utilizing autonomous systems to detect potential threats using visual, infra-red, and LIDAR images from one or more sensors 1550. In embodiments, these sensors 1550 may detect other vehicles and/or objects within an area or other potential dangerous environmental conditions that may be problematic to operation of an air vehicle. In embodiments, a control system 1500 may communicate with a tether, flexible tension member, a probe and/or a linking assembly 1560.

In embodiments, the EPSS system, the linking assembly, the probe, or the tether 1560, or either of the air vehicles may include sensors 1555 for a detection of potential safety threats to the air vehicles. In embodiments, such detection and sensor systems may include detectors to measure a quality of continued power transfer through a tether. In embodiments, detectors may also measure continued operation and control of the various vehicles within the system from a command and control system 1545. In embodiments, autonomous systems may also detect potential threats using visual, infra-red, and LIDAR images. In embodiments, visual, infra-red, LIDAR, or other such sensors may be installed on the first air vehicle, the second air vehicle, the EPSS or on the wayside power system. In embodiments, wherein such sensors 1550 are installed on the wayside power system, the safety or multiple vehicles may be evaluated because the sensors 1550 may be utilized by any air vehicles that are in the range or vicinity of the sensor on the wayside power system.

In embodiments, the wayside control system and safety system 1545 may disconnect power transfer to an elevated power supply system 1570 for routing, system safety and security or any other related reasons like a potential collision between vehicles if they continue on the planned course or trajectory. For example, the wayside control system 1545 may disconnect power supply to the EPSS 1570 if the wayside control system determines, based on sensor data, that a malfunction with the operation of the second vehicle, a malfunction of the tether, and/or a malfunction of any other vehicle in the system has occurred and that malfunction may pose a risk to the safety and security of the passenger on board the air vehicles within the system. In embodiments, autonomous systems may be visual, infra-red, LIDAR or other such sensors systems, or a combination thereof. In embodiments, these autonomous systems may be installed on the air vehicles 1560 and/or may be installed on the wayside towers 1550 of a transportation system. In this illustrative embodiment, when such sensors are installed on the wayside towers or other wayside structures, the sensor systems may be utilized to provide and/or evaluate safety conditions for multiple air vehicles within the range of such vehicles. In embodiments, the sensor system may include multiple cameras, infrared detectors or LIDAR systems or a combination thereof. In embodiments, one or more of the sensor systems 1550 or 1560 may image or take measurements in areas surrounding one or more air vehicles. In embodiments, a control and/or command system (which may be located on ground, within one or more air vehicles, or a physical structure or at another geographical location), may communicate with one or more air vehicles to identify location of objects, other vehicles or dangerous conditions and provide instructions to guide one or more air vehicles to avoid the other vehicles or objects.

In embodiments, an on-board air vehicle control system 1500 may communicate with and work in coordination with a wayside control system 1545. In embodiments, an air vehicle control system may be a computing device. In embodiments, the control systems (e.g., wayside control system 1545 and/or on-board air vehicle control system 1500) may utilize user and operator or predetermined preferences to determine an optimal trajectory, speed, altitude, and/or other such travel attributes like time dependent speed, orientation, and/or accelerations, of a primary air vehicle, a secondary air vehicle and/or or a probe (and/or linking assemblies).

In embodiments, a control system 1500 or 1545 may determine a length of the flexible tension member or tether 1555. In embodiments, a length of a flexible tension member 1555 may be variable during a flight of the primary air vehicle and a secondary air vehicle. In embodiments, the length of the flexible tension member may be adjustable or variable as determined and/controlled by a control system 1500 or 1545 in order to provide safe, reliable, and/or efficient operation of the transportation system. In embodiments, a control system may be a computing device. In embodiments, a control system 1500 or 1545 may determine and/or calculate a length of the flexible tension member 1555 based at least in part on a speed of the primary vehicle, the trajectory of the primary air vehicle, instantaneous wind loading in an environment around the primary air vehicle, the secondary air vehicle and the EPSS 1570, as well as other factors. In embodiments, a length of a flexible tension member may be varied by using a spool retracting system or assembly 1525 that winds or rolls the flexible tension member on a spool at the primary vehicle end, the secondary vehicle end, or both or other such means of changing the length of the flexible tension member 1555 during flight.

In embodiments, a control system 1500 or 1545 may determine and/or calculate the clocking angles of the tethers with a horizontal plane, i.e. the horizontal distances, and the vertical distances between air vehicle and the power cables EPSS-based power system 1570. In embodiments, a control system 1500 or 1545 may calculate the clocking angles, the horizontal distances, and/or the vertical distances between different air vehicles based at least in part on 1) various loads on the one or more air vehicles and loads on air vehicles including vehicle masses, aerodynamics and wind loads; 2) lift, guidance and propulsion capabilities of the air vehicles; 3) availability of the emergency landing sites; 4) air vehicle speeds; 5) numbers of vehicles in the system; or 6) how far the vehicles are spaced apart; or 7) a combination thereof.

In embodiments, the wayside control system and safety system 1545 may disconnect power transfer to an elevated power supply system 1570 for routing, system safety and security or any other related reasons like a potential collision between vehicles if they continue on the planned course or trajectory. For example, the wayside control system 1545 may disconnect power supply to the EPSS 1570 if the wayside control system determines, based on sensor data, that a malfunction with the operation of the second vehicle, a malfunction of the tether, and/or a malfunction of any other vehicle in the system has occurred and that malfunction may pose a risk to the safety and security of the passenger on board the air vehicles within the system.

Figure 16:
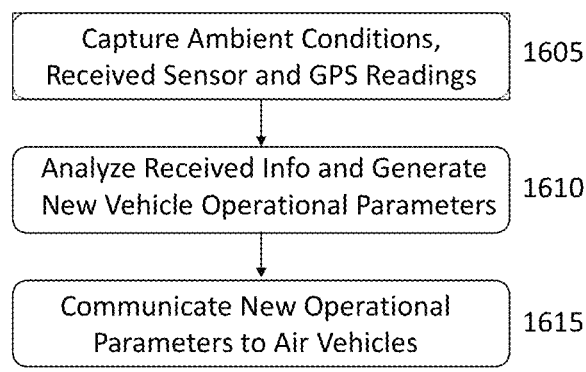
FIG. 16 illustrates flowcharts for communicating operational parameters to air vehicles and to disconnect an EPSS from air vehicles according to embodiments
Figure 16:
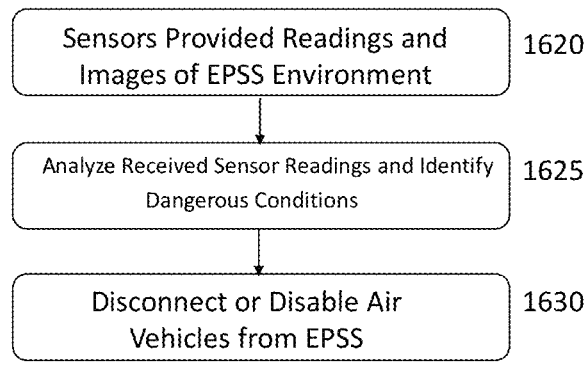

FIG. 16 illustrates flowcharts for communicating operational parameters to air vehicles and to disconnect an EPSS from air vehicles according to embodiments. In embodiments, the steps in the process may be performed in any order and FIG. 16 is just an illustrative order. In embodiments, weather or environment detectors may capture 1605 ambient conditions, sensors may capture sensor measurements or conditions, and GPS receivers on air vehicles and other structures may receive GPS measurements and readings. In embodiments, the above-identified information, either separately or in combination may be communicated to a control system or a central command and control system. In embodiments, the control system or the central command and control system may analyze received information, measurements and/or readings and may determine and/or generate 1610 new vehicle operational parameters for one or more air vehicles utilizing the transportation system. In embodiments, the control system or the central command and control system may communicate 1615 new operational parameters to the one or more air vehicles.

In embodiments, a safety process may also be executed by a control system or a central command and control system. In embodiments, sensors may provide 1620 readings, measurements and/or images of an environment around an EPSS and/or cameras may provide images and/or source from the environment around the EPSS. In embodiments, a control system or a central command and control system may analyze received sensor readings and/or received imaged and Identify and/or determine 1625 if dangerous conditions are present and/or events have occurred in the environment surround the EPSS. In embodiments, if the control system or central command and control system determines dangerous conditions are present or a dangerous event has occurred, the control system or central command and control system may generate commands and/or instructions and communicate the instructions 1630 to the EPSS and the one or more air vehicles to disconnect from the EPSS for a period of time.

A computing device may be a server, a computer, a laptop computer, a mobile computing device, a mobile communications device, and/or a tablet. A computing device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer or computing device, an integrated device combining various features, such as features of the forgoing devices, or the like.

Internal architecture of a computing device includes one or more processors (also referred to herein as CPUs), which interface with at least one computer bus. Also interfacing with computer bus are persistent storage medium/media, network interface, memory, e.g., random access memory (RAM), run-time transient memory, read only memory (ROM), etc., media disk drive interface, an interface for a drive that can read and/or write to media including removable media such as floppy, CD-ROM, DVD, etc., media, display interface as interface for a monitor or other display device, keyboard interface as interface for a keyboard, mouse, trackball and/or pointing device, and other interfaces not shown individually, such as parallel and serial port interfaces, a universal serial bus (USB) interface, and the like.

Memory, in a computing device or other systems, interfaces with computer bus so as to provide information stored in memory to processor during execution of software programs such as an operating system, application programs, device drivers, and software modules that comprise program code or logic, and/or computer-executable process steps, incorporating functionality described herein, e.g., one or more of process flows described herein. CPU first loads computer-executable process steps or logic from storage, storage medium/media, removable media drive, and/or other storage device. CPU can then execute the stored process steps in order to execute the loaded computer-executable process steps. Stored data, e.g., data stored by a storage device, can be accessed by CPU during the execution of computer-executable process steps.

Non-volatile storage medium/media is a computer readable storage medium(s) that can be used to store software and data, e.g., an operating system and one or more application programs, in a computing device or storage subsystem of an intelligent shading object. Persistent storage medium/media also be used to store device drivers, such as one or more of a digital camera driver, monitor driver, printer driver, scanner driver, or other device drivers, web pages, content files, metadata, playlists and other files. Non-volatile storage medium/media can further include program modules/program logic in accordance with embodiments described herein and data files used to implement one or more embodiments of the present disclosure.

A computing device or a processor or controller may include or may execute a variety of operating systems, including a personal computer operating system, application server operating systems, database server operating systems, desktop computer operating systems, laptop computer operating systems, tablet computer operating systems and/or wearable computing device operating systems. A computing device, or a processor or controller may include or may execute a variety of possible applications, such as a software applications enabling communication with other devices, such as communicating one or more messages such as via email, short message service (SMS), or multimedia message service (MMS). A computing device or a processor or controller may also include or execute an application to communicate content, such as, for example, textual content, multimedia content, or the like. A computing device or a processor or controller in an intelligent shading object may also include or execute an application to perform a variety of possible tasks, such as browsing, searching, playing various forms of content, including locally stored or streamed content. The foregoing is provided to illustrate that claimed subject matter is intended to include a wide range of possible features or capabilities. A computing device or a processor or controller in an intelligent shading object may also include imaging software applications for capturing, processing, modifying and transmitting image files utilizing the optical device (e.g., camera, scanner, optical reader) within a mobile computing device.

Computing devices may communicate with each other and/or servers via communication networks (wired or wireless communication network), which may be referred to as network links. In embodiments, network links typically provides information communication using transmission media through one or more networks to other devices that use or process the information. For example, network link or communication networks may provide a connection through a network (LAN, WAN, Internet, packet-based or circuit-switched network) to a server, which may be operated by a third party housing and/or hosting service. The server or server computing device hosts a process that provides services in response to information received over the network, for example, like application, database or storage services. It is contemplated that the components of system can be deployed in various configurations within other computer systems, e.g., host and server.

For the purposes of this disclosure a computer readable medium stores computer data, which data can include computer program code that is executable by a computing device, in machine-readable form. By way of example, and not limitation, a computer-readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more computing devices, or be loaded and executed by one or more computing devices. One or more modules may be grouped into an engine or an application The above disclosure is sufficient to enable one of ordinary skill in the art to practice the invention, and provides the best mode of practicing the invention presently contemplated by the inventor. While there is provided herein a full and complete disclosure of the preferred configurations of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. An in-flight charging system to charge a first electric air vehicle, comprising:
   a first electric air vehicle comprising a first spooling system;
   a second electric air vehicle comprising a second spooling system;
   an elevated power supply system (EPSS), the EPSS comprising one or more current carrying conductors, wherein the second electric air vehicle to travel along the one or more current carrying conductors and to receive power transferred from the one or more current carrying conductors; and
   a tether coupled at a first end to the first spooling system in the first electric air vehicle and coupled at a second end to the second spooling system in the second electric air vehicle, the tether to provide power, received from the EPSS, from the second electric vehicle to the first electric vehicle.

2. The in-flight charging system of claim 1, the first spooling system to comprise a first spool and a first spool retracting/deployment assembly and the second spooling system to comprise a second spool and a second spool retracting/deployment assembly.

3. The in-flight charging system of claim 2, further comprising one or more sensor devices and a control system, the one or more sensor devices to monitor and determine conditions of the tether.

4. The in-flight charging system of claim 3, the control system to analyze the determined tether conditions and to determine if the tether is damaged or in a potentially dangerous position with respect to propellers of the second air electric vehicle.

5. The in-flight charging system of claim 4, the control system to communicate commands to one or more of the first spool retracting/deployment assembly or the second spool retracting/deployment assembly to retract a portion of the tether to the first spool and/or a portion of the tether to the second spool.

6. The in-flight charging system of claim 5, the control system to control operating parameters of the first electric air vehicle and the second electric air vehicle, the operating parameters comprising one or more of position, power transfer, speed, orientation or trajectory.

7. The in-flight charging system of claim 6, further comprising an additional one or more elevated power supply systems, the one or more elevated power supply systems to be positioned along travel route of one or more electric aircraft systems, the additional one or more elevated power supply systems to engage with the second electric air vehicle of the one or more electric aircraft systems to transfer power from the additional one or more elevated power supply systems to the first electric air vehicle,
   wherein the additional one or more elevated power supply systems to operate at a specified voltage range and a specified current range, and
   wherein the additional one or more elevated power supply systems to comprise one or more current carrying conductors to supply power via direct contact or inductive or capacitive coupling with the second electric air vehicle of the one or more electric aircraft systems.

8. The system of claim 7, wherein the additional one or more elevated power supply systems transfer power to the second electric air vehicle of the one or more electric aircraft systems is via one or more contacting strips or bushings, the one or more contacting strips or the bushings connected to the one or more current carrying conductors or a catenary.

9. The system of claim 7, wherein the additional one or more elevated power supply systems transfer power to the second electric air vehicle of the one or more electric aircraft systems via of one or more coils or inductive loops, the one or more coils or inductive loops positioned in an orientation and a proximity to transfer power from the one or more current carrying conductors of the additional one or more elevated power supply systems to the second air vehicle via inductive coupling.

10. The system of claim 7, further comprising one or more cables comprising the one or more current carrying conductors, the one or more cables connected to a side of a pole at a height, the pole to be anchored to a ground surface by a concrete foundation of a floating anchor in a water body.

11. The system of claim 7, further comprising one or more cables comprising the one or more current carrying conductors, the one or more cables to be held in place at a distance from a ground surface by one or more unmanned aerial vehicles.

12. The system of claim 11, wherein the one or more unmanned aerial vehicles holding the cables are powered by the additional one or more elevated power supply systems.

* * * * *